Patented Mar. 2, 1948

2,436,884

UNITED STATES PATENT OFFICE 2,436,884

COATED WELDING ROD

Johann Diedrich Fast, Eindhoven, Netherlands, assignor to Hartford National Bank and Trust Company, Hartford, Conn., as trustee No Drawing. Application January 29, 1943, Serial No. 474,002. In the Netherlands March 15, 1941

Section 1, Public Law 690, August 8, 1946
Patent expires March 15, 1961

7 Claims. (Cl. 219—8)

It is known that in electric-arc welding by means of a welding wire consisting of iron or an iron alloy the arc may sometimes become extinguished. Particularly in the absence of a slag forming coating this phenomenon, besides another annoying phenomenon viz. so-called fluttering of the arc, may make its appearance.

When making use of a slag forming coating in which case an alkaline earth compound was often used, one succeeded in many cases satisfactorily to avoid the said troublesome phenomenon of extinction.

In the further development of the welding technique the requirements imposed on the quality of the weld were steadily raised, more particularly in mechanical respect, to which the composition of the slag forming coating had to be accommodated. In many cases it appeared that the occurrence of extinction was promoted thereby; hence, it is of importance in such cases to have an expedient for counteracting the extinction. The present invention is concerned with this problem. Thus, it does not include coated welding rods, with which the phenomenon of extinction without making use of the invention does not occur and which, therefore, fall beyond the scope of the present exclusive rights. In the present case a type of welding rod is considered to be not liable to extinction if the phenomenon of extinction does not occur at all in carrying out the welding operation with five of these rods, having a length of about 45 cm. by means of a transformer having an open circuit voltage of 55 to 60.

The occurrence of extinction is acted upon by the composition of the slag forming mass and in addition by the open circuit voltage of the apparatus used in welding (welding transformer or welding rectifier), it being pointed out that it is objectionable to prevent extinction by raising the open circuit voltage, particularly on account of the danger which may be incurred thereby.

Irrespective of the loss of time involved by the repeated occurrence of extinction, this may also affect the envisaged quality of the weld.

Particularly when making use of alternating current extinction may occur, which is probably related with the periodic change of direction of the electric current, owing to which the arc is interrupted many times a second. Naturally, the expression "to extinguish" does not include these periodic interruptions.

The invention purports to counteract the extinction in welding by means of coated welding rods having a core consisting of iron or an iron alloy (containing more than 50% of iron) in which we succeed, according to the invention, by making use of magnesium in its metallic form as an auxiliary material. The use of the invention procures an improvement also in regard to the so-called starting-up of the arc, i. e. that an arc can be struck more easily and swiftly between the piece of work and the welding rod.

The magnesium may be used in the form of an alloy, for instance as a magnesium-aluminum alloy, which offers the advantage of being cheaply obtainable in the form of waste of articles made from this alloy.

In one executional example of the invention the magnesium is united with the iron or the iron alloy of the core of a welding rod, for instance alloyed with this metal or incorporated in a hollow core.

In another executional example the magnesium or the magnesium alloy with coated welding rods may be mixed in the form of powder with a slag forming mass, whereupon the latter is applied to the core of a welding rod. As an alternative, the magnesium may be applied to the core in the form of a powder layer containing, for instance, a lacquer as a binder, and after that a slag forming coating mass may be applied. By thus adding magnesium the quantity thereof required for counteracting the phenomenon of extinction is smaller than if the magnesium is mixed with the slag forming mass. Moreover, during application of the coating on a metal core in the last-mentioned manner the risk of undesired reactions between the magnesium and the remainder of the coating mass, which is still moist, is smaller.

As has already been pointed out above, the invention is of particular importance when the attempts are directed to a weld having excellent properties, particularly a great notch shock toughness, in which case the user is likely to impose high requirements also in other respects, inter alia in regard to extinction. A slag forming mass for such purpose, which is especially used as a coating for high grade welding rods having an iron core or a core consisting of an iron alloy (containing more than 50% of iron) generally contains a reducing metal such as ferro-manganese, ferro-silicon, ferro-titanium, iron powder or the like. In preparing such a slag forming mass of fluoride, more particularly calcium fluoride is often used which has a detrimental effect on the extinction and in which case the use of the invention is particularly advantageous.

Thus, for instance, it has turned out in electric-arc welding by means of such welding rods furnished with a slag forming coating which besides reducing ferro-alloys also contains alkaline earth carbonate, water glass, highly refractory silicates, iron oxides or, for instance, alkaline earth carbonate, water glass, calcium fluoride, that the annoying extinction, when making use of a welding transformer having an open circuit voltage of say about 60, is counteracted and even practically entirely prevented by the presence of a few percent by weight of magnesium or of the magnesium alloy commercially known under the registered trade mark "Electron" (containing 90 or more than 90 per cent by weight of magnesium) in the form of powder in the coating.

This may be better understood by pointing out, that a quantity of about 2 to 5 per cent by weight of the coating permits the extinction to be prevented, if the magnesium or the said magnesium-aluminium alloy is mixed with the coating forming slag, whereas about 0.5 to 3 per cent. by weight of the coating is sufficient, if the metal core is first provided with a powder layer of magnesium or of the magnesium alloy, whereupon the slag forming mass is applied.

To be complete it is stated that a coating for welding rods has already been described, for instance in British Patent Specification 144,333, which contains magnesium, which serves to protect the core metal of the welding rod during the welding operation against the action of the oxygen of the air.

According to the invention the attempts are directed to the purpose outlined above, which is entirely different therefrom, to counteract the occurrence of extinction in welding by means of coated welding rods having a core consisting of iron or an iron alloy, and furthermore the exclusive rights accruing from the invention are pegged out from the prior art, since in carrying out the invention use is made of a slag forming coating which for reduction purposes still contains a reducing material other than magnesium. In addition, it may be pointed out that the said British Patent Specification 144,333 discloses a coating for welding rods which is obtained in the form of a very thin film by making use of a highly diluted dispersion, so that this coating accordingly produces such a thin layer on the weld that, according to the said patent specification it cannot be termed slag. The invention is different from these particularly coated welding rods in that use is made of a slag forming coating, such as can be provided by pressing for instance, and which forms in the usual way a coherent layer of slag melted together on the weld and which, therefore, is termed "forming slag" hereinbefore.

I claim:

1. A welding electrode for electric arc welding comprising a core consisting of at least about 50 per cent of iron, a slag-forming coating on said core, a reducing agent in said coating consisting of a sufficient percentage of material other than magnesium to prevent oxidation of the iron metal during welding, and an arc preserving agent consisting of at least about 90 per cent of magnesium incorporated in the coated electrode, for preventing extinction of the arc during welding.

2. A welding electrode for electric arc welding comprising a core consisting of at least about 50 percent of iron, a slag-forming coating on said core, a reducing agent in said coating consisting of a sufficient percentage of material other than magnesium to prevent oxidation of the iron metal during welding, and an arc preserving agent consisting of at least about 90 per cent of magnesium incorporated in the coated electrode in an amount of from about 0.5 to about 5 per cent by weight of the coating, for preventing extinction of the arc during welding.

3. A welding electrode for electric arc welding comprising a core consisting of a metal selected from the group constituted by iron and iron alloys containing at least about 50 percent of iron, a slag-forming coating on said core, a reducing agent in said coating consisting of a sufficient percentage of material other than magnesium to prevent oxidation of the iron metal during welding, and an arc preserving agent consisting of at least about 90 percent of magnesium incorporated in said core in an amount of from about 0.5 to about 5 per cent by weight of the coating, for preventing extinction of the arc during welding.

4. A welding electrode for electric arc welding comprising a core consisting of a metal selected from the group constituted by iron and iron alloys containing at least about 50 per cent of iron, a slag-forming coating on said core, a reducing agent in said coating consisting of a sufficient percentage of material other than magnesium to prevent oxidation of the iron metal during welding, and an arc preserving agent consisting of at least about 90 per cent of magnesium incorporated in said coating in an amount of from about 2 to about 5 per cent by weight of the coating, for preventing extinction of the arc during welding.

5. A welding electrode for electric arc welding comprising a core consisting of a metal selected from the group constituted by iron and iron alloys containing at least about 50 per cent of iron, a slag-forming coating on said core, a reducing agent in said coating consisting of a sufficient percentage of material other than magnesium to prevent oxidation of the iron metal during welding, and an arc preserving agent consisting of at least about 90 per cent of magnesium incorporated, in the form of a separate layer interposed between said coating and said core, in an amount of from about 0.5 to about 3 per cent by weight of the coating, for preventing extinction of the arc during welding.

6. A welding electrode for electric arc welding comprising a core consisting of a metal selected from the group constituted by iron and iron alloys containing at least about 50 per cent of iron, a slag-forming coating on said core, a reducing agent in said coating consisting of a sufficient percentage of material selected from the group constituted by iron and reducing iron alloys, to prevent oxidation of the iron metal during welding, and an arc preserving agent consisting of at least about 90 per cent of magnesium incorporated in the coated electrode in an amount of from about 0.5 to about 5 per cent by weight of the coating, for preventing extinction of the arc during welding.

7. A welding electrode for electric arc welding comprising a core consisting of a metal selected from the group constituted by iron and iron alloys containing at least about 50 per cent of iron, a slag-forming coating on said core, a reducing agent in said coating consisting of a sufficient percentage of material selected from the group constituted by iron powder and iron-manganese, iron-silicon and iron-titanium alloys, to prevent oxidation of the iron metal during welding, and an arc preserving agent consisting of at least about 90 per cent of magnesium incorporated in the coated electrode in an amount of from about 0.5 to about 5 per cent by weight of the coating, for preventing extinction of the arc during welding.

JOHANN DIEDRICH FAST.